(12) United States Patent
Bernadat et al.

(10) Patent No.: US 8,991,171 B2
(45) Date of Patent: Mar. 31, 2015

(54) CUP OF A MASTER CYLINDER, ADVANTAGEOUSLY A TANDEM MASTER CYLINDER AND TANDEM MASTER CYLINDER PROVIDED WITH SUCH CUPS

(75) Inventors: Olivier Bernadat, Le Perreux (FR); Marc Noblet, Paris (FR); Julien Gateau, Gentilly (FR); François Gaget, Saint Leu d'Esserent (FR); Marc Rodriguez, Jouy le Moutier (FR)

(73) Assignee: Robert Bosch GmbH, Stuttgart (DE)

( * ) Notice: Subject to any disclaimer, the term of this patent is extended or adjusted under 35 U.S.C. 154(b) by 631 days.

(21) Appl. No.: 13/377,620

(22) PCT Filed: Jun. 11, 2010

(86) PCT No.: PCT/EP2010/058231
§ 371 (c)(1),
(2), (4) Date: Dec. 12, 2011

(87) PCT Pub. No.: WO2010/146000
PCT Pub. Date: Dec. 23, 2010

(65) Prior Publication Data
US 2012/0096848 A1    Apr. 26, 2012

(30) Foreign Application Priority Data

Jun. 16, 2009   (FR) ..................................... 09 02928

(51) Int. Cl.
*B60T 11/236* (2006.01)
*F16J 15/32* (2006.01)
(52) U.S. Cl.
CPC ........... *B60T 11/236* (2013.01); *F16J 15/3236* (2013.01)

USPC ............................................... 60/588; 60/585
(58) Field of Classification Search
USPC .................................................... 60/585, 588
See application file for complete search history.

(56) References Cited

U.S. PATENT DOCUMENTS

| 4,061,346 | A | 12/1977 | Coleman et al. |
| 6,928,815 | B2 | 8/2005 | Ishida |
| 7,032,380 | B2 | 4/2006 | Tsubouchi et al. |

(Continued)

FOREIGN PATENT DOCUMENTS

| CN | 1781787 | 6/2006 |
| CN | 201015990 | 2/2008 |
| EP | 1616768 | 1/2006 |
| FR | 2912713 A1 | 8/2008 |

(Continued)

OTHER PUBLICATIONS

PCT/EP2010/058231 International Search Report.

*Primary Examiner* — Thomas E Lazo
(74) *Attorney, Agent, or Firm* — Michael Best & Friedrich LLP

(57) ABSTRACT

A cup for a master cylinder coming into contact with its primary piston or its secondary piston and subjected to the pressure of the brake fluid of the primary chamber and of the secondary chamber. The cup has two large grooves bordered: by a rib between the heel and the first groove, by a rib between the first groove and the second groove, by a rib between the second groove and the small grooves, these ribs being in protrusion relative to the cylindrical surface of the heel in the mounted position of the cup in order to separate the heel from the surface of the piston and form, between the heel and the surface of the piston, a gap with a film of brake fluid. Master cylinder notably a tandem master cylinder fitted with such cups.

12 Claims, 2 Drawing Sheets

(56) References Cited

U.S. PATENT DOCUMENTS

| | | |
|---|---|---|
| 7,181,911 B2 * | 2/2007 | Ishikawa et al. ............... 60/588 |
| 7,934,378 B2 * | 5/2011 | Gaffe et al. .................... 60/588 |
| 7,963,113 B2 | 6/2011 | Hanaoka et al. |
| 2009/0071325 A1 * | 3/2009 | Hanaoka et al. ............. 277/434 |
| 2009/0090105 A1 | 4/2009 | Taira |

FOREIGN PATENT DOCUMENTS

| | | |
|---|---|---|
| JP | S61112865 | 5/1986 |
| JP | H0723863 | 5/1995 |
| JP | 2003194100 | 7/2003 |
| JP | 2005220931 | 8/2005 |
| JP | 2009061849 | 3/2009 |

* cited by examiner

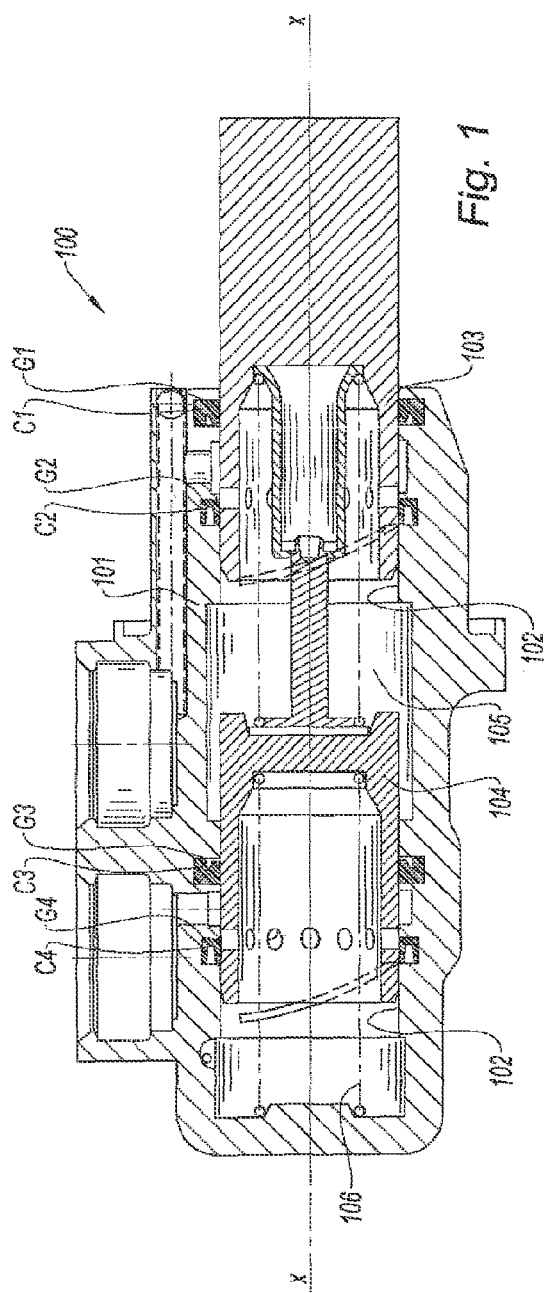
Fig. 1
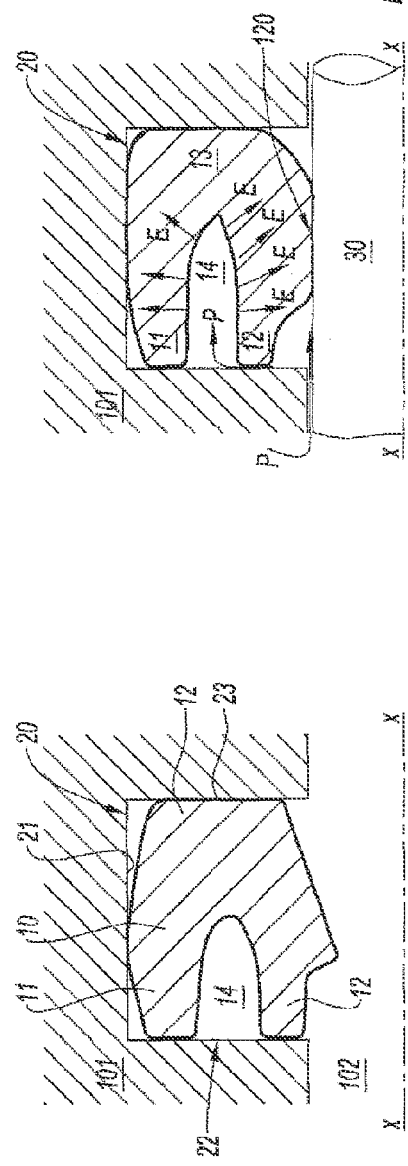
Fig. 2A
Fig. 2B

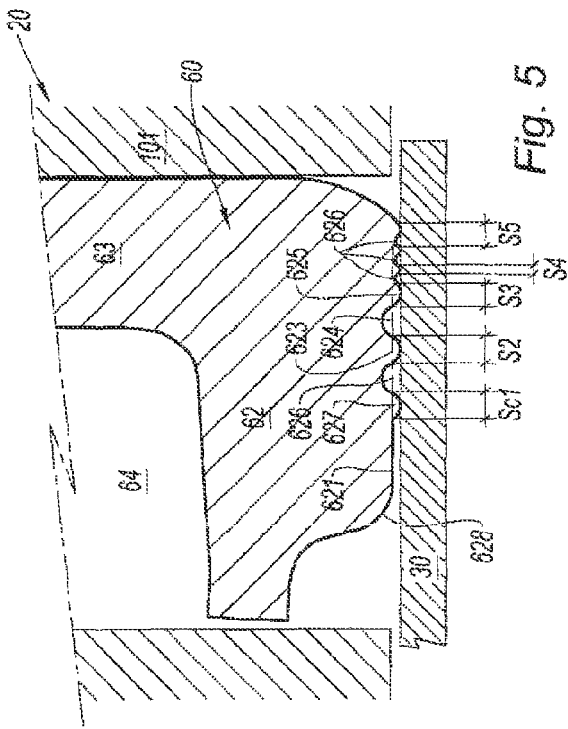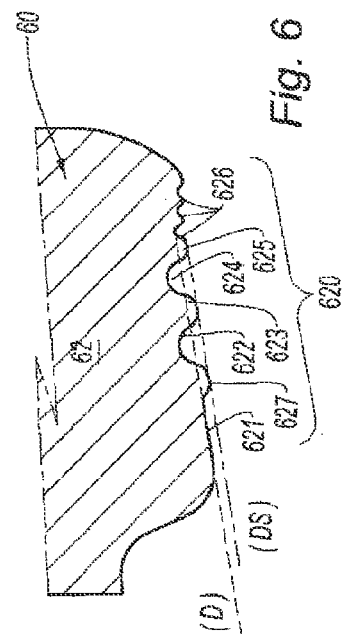
Fig. 5
Fig. 6
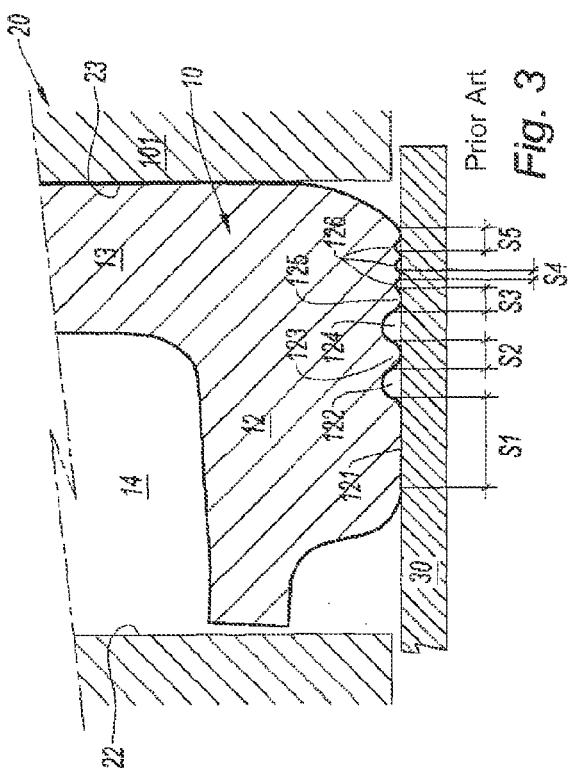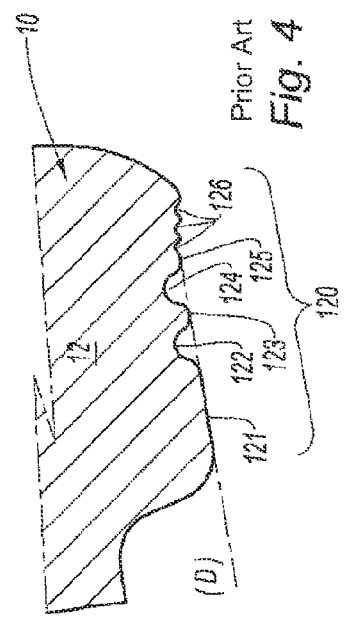
Prior Art
Fig. 3
Prior Art
Fig. 4

CUP OF A MASTER CYLINDER, ADVANTAGEOUSLY A TANDEM MASTER CYLINDER AND TANDEM MASTER CYLINDER PROVIDED WITH SUCH CUPS

BACKGROUND OF THE INVENTION

The present invention relates to a cup for a master cylinder, a master cylinder, advantageously a tandem master cylinder, fitted with such cups, coming into contact with its primary piston or its secondary piston and said elements being subjected to the pressure of the brake fluid of the primary chamber and of the secondary chamber.

The cup in the shape of a seal with a section like a U on its side being housed in a groove of the bore of the body of the master cylinder receiving the primary and secondary pistons, the outer lip of the cup being pressed against the bottom of the groove and its inner lip being pressed by its outer surface against the piston (primary or secondary), this outer surface of revolution having, between the end of the lip and the bottom of the cup, a section forming a heel followed by a corrugated profile comprising at least two large grooves and a succession of small grooves forming with the piston annular cavities trapping the brake fluid.

There are such isolating/separating tandem master-cylinder cups subjected to the pressure of the brake fluid of the primary chamber and of the secondary chamber described in document EP 1616768 A1, which have a lip or a heel being pressed over the whole peripheral surface against the peripheral surface of the primary piston or of the secondary piston of the master cylinder. This heel or lip is followed by grooves, namely first two large grooves then a succession of small grooves forming peripheral volumes receiving fluid and the partitions between the grooves being pressed, when the tandem master cylinder is under pressure, against the surface of the primary and secondary pistons.

SUMMARY OF THE INVENTION

The object of the present invention is to reduce the friction under pressure of the tandem master-cylinder separating/isolating cups in order to improve operation, that is to say efficiency.

Accordingly, the invention relates to a tandem master-cylinder cup of the type defined above, characterized in that the two large grooves are bordered:
  by a rib between the heel and the first groove,
  by a rib between the first groove and the second groove,
  by a rib between the second groove and the small grooves,
  these ribs being in protrusion relative to the cylindrical surface of the heel in the mounted position of the cup in order to separate the heel from the surface of the piston and form, between the heel and the surface of the piston, a gap with a film of brake fluid.

This master-cylinder cup provides the advantage of considerably reducing the friction under pressure between the cup and the primary or secondary piston against which it is pressed, by virtue of the considerable reduction of the contact surfaces between the cup and the piston and also by virtue of the formation of a film of brake fluid between the lip or heel of the cup and the surface of the piston.

This makes it possible to considerably improve the efficiency of the tandem master cylinder.

According to another feature, the protrusion of the ribs relative to the cylindrical surface of the heel is of the order of 5/100 mm.

According to another advantageous feature, from the heel, the ribs and the grooves have a corrugated profile.

The invention also relates to a tandem master cylinder fitted with cups as defined above, characterized in that at least the isolating/separating cups each have two large grooves bordered:
  by a rib between the heel and the first groove,
  by a rib between the first groove and the second groove,
  by a rib between the second groove and the small grooves.

BRIEF DESCRIPTION OF THE DRAWINGS

The present invention will be described below in greater detail with the aid of an example of a master-cylinder cup according to the invention shown schematically in the appended drawings in which:

FIG. 1 is a diagram of a tandem master cylinder showing the pistons and the cups, FIGS. 2A, 2B show very schematically in section and on an enlarged scale respectively the half-section of a cup in its groove but not in contact with the piston and the cup in its groove, in contact with the piston, FIG. 3 shows the section on a much enlarged scale of a known cup of which the inner lip is pressed against the piston, FIG. 4 shows the shape of the profile of the outer surface of the cup of FIG. 3, at rest, with no contact with the piston, FIG. 5 is a view in section similar to that of FIG. 3 of the cup according to the invention, pressed against the surface of the piston, FIG. 6 is a view of the section of the cup according to the invention before being pressed against the piston.

DETAILED DESCRIPTION

As a preliminary comment and by convention, the sectioned portions have cross-hatchings in order to make the drawings easier to read. However, these cross-hatchings correspond to no material code. The cups according to the invention are made of a flexible material compatible with the brake fluid, advantageously an elastomer and preferably of EPDM, for example of EPFM 15 53.

According to FIG. 1, the invention relates to cups C1-C4, that is to say the seals installed in the grooves G1-G4 of a tandem master cylinder 100 in order to provide the seal between the various zones of the master cylinder relative to the primary piston 103 and secondary piston 104.

The tandem master cylinder 100 consists of a body 101 furnished with a bore 102 with an axis XX in which a primary piston 103 and a secondary piston 104 slide. The primary piston 103 delimits a primary chamber 105 in the bore 102 and the secondary piston 104. The secondary piston 104 delimits a secondary chamber 106 in the bore 102.

The primary chamber 105 and the secondary chamber 106 can communicate with the brake fluid reservoir not shown depending on the position of the primary piston 103 and of the secondary piston 104 in a known manner, usually by ducts that are stopped or closed off by the movement of the pistons. These various means will not be described in detail.

The seal between the various portions of the bore 102, such as the primary chamber 105 and secondary chamber 106 and the primary piston 103 and secondary piston 104 is provided by the cups C1-C4 housed in the grooves G1-G4.

Thus, the master cylinder 100 is fitted with cups, namely an isolating cup C1 in the groove G1 separating the inlet of the bore 102 of the master cylinder 100 that is at atmospheric pressure or at the reduced pressure prevailing in the brake servo unit not shown and the zone into which the duct leads at atmospheric pressure coming from the brake fluid reservoir, a second cup C2 in the groove G2 separating the zone into which the brake fluid duct leads coming from the reservoir and the primary chamber 105;

the cups C1 and C2 interact with the primary piston 103;

a third cup C3 in the groove G3 between the primary chamber 105 and the zone into which the second brake fluid duct leads from the reservoir, at atmospheric pressure, a fourth cup C4 in the groove G4 separating the secondary chamber 106 and the zone into which the second brake fluid duct leads from the reservoir, at atmospheric pressure, the cups C3 and C4 interact with the secondary piston 104.

The cups C2, C3 are exposed to the pressure of the primary chamber 105 and the cup C4 to the pressure of the secondary chamber 106 (relative to atmospheric pressure).

As is shown very schematically in FIG. 2A, on a greatly enlarged scale and along a half-section relative to the axis XX of the bore 102, a cup 10 has, in the rest state, that is to say before being installed in the groove 20 or before the piston 30 (primary or secondary) pushes it into its groove 20, a structure of revolution about the axis XX generated by a section with a shape of a U on its side. This section like a U on its side has an outer lip 11 (relative to the axis of revolution XX) pressed against the bottom 21 of the groove 20 and the other inner lip 12 is designed to be pressed elastically against the outer surface of the piston 30. The end of each lip 11, 12 is pressing against the side 22 of the groove 20 and the back 13 is pressed against the other side 23 of the groove 20.

In the mounted state, when the piston 30 is in place, the cup 10 has the shape schematically shown in FIG. 2B. The lips 11, 12 and the back 13 are squeezed against the bottom 21, the sides 22, 23 of the groove 20 and against the piston 30.

The cavity 14 of the cup 10 is turned toward the master cylinder where the highest pressure or pressure difference prevails. Thus, in the case of FIG. 2B, the pressure P of the primary chamber or of the secondary chamber reaches the groove 20 via the gap between the bore and the surface of the piston in order to be applied to the cavity 14 of the cup 10 while exerting forces in the direction of the arrows E tending to press the seal 12 against the wall of the groove 20 and the piston 30.

Depending on the magnitude of this pressure P (or pressure difference), the lips 11, 12 of the cup 10 are pushed and, in particular the inner lip 12, is pressed with more or less force against the surface of the piston 30 by its inner face 120.

In order to highlight the features of the cup 60 according to the invention, the detailed shape of the known cup 10, shown in FIG. 3 in its active position installed in the groove 20 and subjected to the pressure P, will be described first of all and by way of comparison, FIG. 4 showing the shape of the cup when it is not installed or not subjected to stresses.

Thus, according to FIG. 3, the inner lip 12 of the known cup 10, exposed to the pressure P, has an outer surface 120 of revolution pressed against the outer surface of the piston 30, having a heel 121, followed by a corrugated profile consisting of two large grooves 122, 124 followed by a succession of small grooves 126. The two large grooves 122, 124 are separated by a partition 123.

The second large groove 124 is separated from the small grooves 126 by a partition 125. The heel 121 is pressed flat against the surface of the piston 30 and the grooves 122, 124, 126 form cavities of revolution receiving brake fluid.

FIG. 3 shows the various contact surfaces of the cup 10 with the piston 30:

S1 is the contact surface of the heel 121 with the piston 30,

S2 is the contact surface of the partition 123 between the two large grooves 122, 124 and the piston 30, S3 is the contact surface of the partition of the second large groove 124 and the first small groove 126, S4 and S5 are the contact surfaces between the various small grooves 126.

FIG. 4 shows the shape of the section of the outer surface 120 when the cup is not in tension, for example before the cup 10 is installed in the groove 20 of the master cylinder 100 or before the piston 30 is installed. The heel 121 then corresponds to a conical surface the theoretical extension of which shown by a dot-and-dash straight line (D) is not overshot by the partition 123 between the two large grooves 122, 124 or by the partition 125 after the second large groove 124.

By comparison with the section of the cup 10 according to the prior art, the inner lip 62 of the cup 60, according to the invention shown in partial half-section in FIG. 5, has a corrugated profile 620 consisting of a heel 621 followed by a rib 627 then a first large groove 622 separated by a second large groove 624 by a rib 623 and then a rib 625 separating the second groove 624 from the small grooves 626. The cavity 64 separates the inner lip 62 from the outer lip not shown.

The ribs 627, 623, 625 are in protrusion relative to the section of the heel 621 shown by the dot-and-dash straight line (D). The peaks of the ribs not in contact overshoot the straight line (D) and are situated on a straight line (DS). The space between the straight lines (D) and (DS) is for example of the order of $5/100$ mm. This difference, apparently very slight, is in reality very great relative to the real dimensions of the cup and its grooves.

The ribs 627, 623, 625 press on the piston 30 in the mounted position of the cup 60, so as to separate the heel 621 from the surface of the piston 30 and form a gap 622 occupied by a film of brake fluid 628.

In the neutral, unstressed state, the section of the cup 60 has the shape shown in FIG. 6. In this state, the ribs 627, 623, 625 overshoot the profile of the heel 620 shown by the straight line (D).

The cup 60 presses against the piston 30 via contact surfaces Sc1, S2, S3 for the ribs 627, 623, 625 bordering the two large grooves 622, 624 and via contact surfaces S4, S5 via the small grooves 626. The surfaces S2 and S3 of FIG. 5 are substantially identical to the contact surfaces S2 and S3 of FIG. 3 while the contact surface Sc1 is very small with no common measurement with the surface S1.

The ribs 627, 623, 625 therefore have a dual function: that of reducing the contact surface between the cup 60 and the piston 30 and that, moreover associated with the preceding function, which consists in forming a fluid film between the heel 621 and the piston 30 also by virtue of the situation of the ribs 627, 623, 625 and their number ensuring that the heel 621 is raised.

The comparison between FIG. 5 and FIG. 3 shows the considerable reduction in the contact surfaces replacing the contact surface S1, which is considerable, of the heel with the piston 30 very schematically via the contact surface Sc1.

In conclusion, this reduction in the contact surface and the presence of the fluid film improve the friction conditions under pressure of the cup relative to the primary or secondary piston in a tandem master cylinder.

The invention also relates to a tandem master cylinder fitted with cups like that described above and installed notably in the grooves G2, G3, G4; they form isolating/separating cups, that is to say those exposed to the greatest pressure differences which are the pressure differences in the primary or secondary chamber and atmospheric pressure.

LIST OF COMPONENTS 10 known cup
11 outer lip
12 inner lip
14 cavity of the cup 10
20 groove
21 bottom of the groove
22, 23 sides of the groove
30 piston
100 tandem master cylinder
101 body
102 bore
103 primary piston
104 secondary piston
105 primary chamber
106 secondary chamber
120 inner surface of the inner strip 12
121 heel
122, 124 large grooves
123, 125 partitions
126 small grooves
60 cup according to the invention
62 inner lip
614 cavity of the cup 60
620 outer surface of the inner lip 62
621 heel
622, 623 large grooves
625, 627 ribs
626 small grooves
S1-S5; Sc contact surfaces
C1-C4 cups
D, DS straight lines
P pressure

The invention claimed is:

1. A cup for a master cylinder capable of coming into contact with a primary piston or a secondary piston and capable of being subjected to the pressure of brake fluid of a primary chamber and of a secondary chamber, the cup in the shape of a seal with a section like a U on its side, capable of being housed in a groove of a bore of a body of the master cylinder receiving the primary and secondary pistons, an outer lip of the cup being capable of being pressed against a bottom of the groove and an inner lip of the cup being capable of being pressed by an outer surface against one of the pistons, this outer surface having, between an end of the inner lip and a bottom of the cup, a section forming a heel followed by a corrugated profile comprising at least two large grooves and a succession of small grooves capable of forming with the one of the pistons annular cavities trapping brake fluid, said cup (60) being characterized in that the at least two large grooves (622, 624) are bordered:
by a first rib (627) between the heel (621) and a first large groove (622) of the at least two large grooves,
by a second rib (623) between the first large groove (622) and a second large groove (624) of the at least two large grooves,
by a third rib (625) between the second large groove (624) and the small grooves (626), the first, second, and third ribs (627, 623, 625) being in protrusion (DS) relative to a cylindrical surface (D) of the heel (621) and extending towards a surface of the one of the pistons (30) in a mounted position of the cup (50) in order to separate the heel (620) from the surface of the one of the pistons (30) and capable of forming, between the heel (620) and the surface of the one of the pistons (30), a gap (621) with a film of brake fluid, in that the first and second large grooves (622, 624) define recesses relative to the cylindrical surface (D) of the heel (621) that extend away from the surface of the one of the pistons (30), and in that from the heel (621), the first, second, and third ribs (627, 623, 625) and the first and second large grooves and the small grooves (622, 624, 626) have a corrugated profile.

2. The cup as claimed in claim 1, characterized in that the protrusion of the ribs (627, 623, 625) relative to the cylindrical surface of the heel (621) is of the order of 5/100 mm.

3. A master cylinder comprising isolating/separating cups as claimed in claim 2.

4. A master cylinder comprising isolating/separating cups as claimed in claim 1.

5. The cup as claimed in claim 1, characterized in that the small grooves (626) include ribs being in protrusion (DS) relative to a cylindrical surface (D) of the heel (621).

6. The cup as claimed in claim 5, characterized in that the small grooves (626) include recesses extending away from the surface of the one of the pistons (30) to a depth of the cylindrical surface (D) of the heel (621).

7. The cup as claimed in claim 1, characterized in that the small grooves (626) include recesses extending away from the surface of the one of the pistons (30) to a depth of the cylindrical surface (D) of the heel (621).

8. A master cylinder comprising isolating/separating cups coming into contact with a primary piston or a secondary piston and subjected to the pressure of brake fluid of a primary chamber and of a secondary chamber, the cups in the shape of a seal with a section like a U on its side, housed in a respective groove of a bore of a body of the master cylinder receiving the primary and secondary pistons, an outer lip of each cup being pressed against a bottom of the respective groove and an inner lip of the cup being pressed by an outer surface against one of the pistons, this outer surface having, between an end of the inner lip and a bottom of the cup, a section forming a heel followed by a corrugated profile comprising at least two large grooves and a succession of small grooves forming with the one of the pistons annular cavities trapping brake fluid, characterized in that at least the isolating/separating cups (60) each have two large grooves (622, 624) bordered:
by a first rib (627) between the heel (621) and a first large groove (622) of the at least two large grooves,
by a second rib (623) between the first large groove (622) and a second large groove (624) of the at least two large grooves,
by a third rib (625) between the second large groove (624) and the small grooves (626), the first, second, and third ribs (627, 623, 625) being in protrusion (DS) relative to a cylindrical surface (D) of the heel (621) and extending towards a surface of the one of the pistons (30) in a mounted position of the cup (50) in order to separate the heel (620) from the surface of the one of the pistons (30) and capable of forming, between the heel (620) and the surface of the one of the pistons (30) a gap (621) with a film of brake fluid, in that the first and second large grooves (622, 624) define recesses relative to the cylindrical surface (D) of the heel (621) that extend away from the surface of the one of the pistons (30), and in that from the heel (621), the first, second, and third ribs (627, 623, 625) and the first and second large grooves and the small grooves (622, 624, 626) have a corrugated profile.

9. The master cylinder as claimed in claim 8, characterized in that the master cylinder is a tandem master cylinder (100).

10. The master cylinder as claimed in claim 8, characterized in that the small grooves (626) include ribs being in protrusion (DS) relative to a cylindrical surface (D) of the heel (621).

11. The master cylinder as claimed in claim 10, characterized in that the small grooves (626) include recesses extending away from the surface of the one of the pistons (30) to a depth of the cylindrical surface (D) of the heel (621).

12. The master cylinder as claimed in claim 8, characterized in that the small grooves (626) include recesses extending away from the surface of the one of the pistons (30) to a depth of the cylindrical surface (D) of the heel (621).

* * * * *